UNITED STATES PATENT OFFICE.

CHARLES HENRY WORSNOP, OF HALIFAX, ENGLAND, ASSIGNOR TO HIMSELF AND THE WORSNOP & COMPANY, LIMITED, OF SAME PLACE, AND HENRY EDWIN HODGSON, OF CLECKHEATON, ENGLAND.

COMPOSITION OF MATTER FOR MAKING GAS.

SPECIFICATION forming part of Letters Patent No. 656,238, dated August 21, 1900.

Application filed March 15, 1900. Serial No. 8,701. (No specimens.)

*To all whom it may concern:*

Be it known that I, CHARLES HENRY WORSNOP, a British subject, residing in Halifax, county of York, England, (post-office address No. 6 Carlton Place, Halifax, England,) have invented a new and useful Composition of Matter to be Used for the Production of Illuminating-Gas, of which the following is a specification.

Provisional application for this invention has been filed in Great Britain, dated August 18, 1899, No. 16,763.

My composition consists of the following ingredients, viz: carbid of calcium, wax, cocoa-butter, and sugar.

The composition may best be produced as follows: The wax, preferably paraffin-wax, cocoa-butter, and sugar in equal parts are mixed and heated sufficiently to melt the mixture. At this point add a comparatively-weak organic acid, such as tartaric acid, until the sugar becomes of the same consistency as the wax and cocoa-butter. Then immerse the carbid of calcium in the hot liquid mixture and allow it to remain for a sufficient period of time to become thoroughly impregnated. The impregnated carbid of calcium may then be withdrawn and placed on trays in a cooling-chamber, and when cooled the new composition is complete.

The new composition can be transported from place to place without danger and may be left in the open air without danger, being unaffected by the ordinary atmosphere or by a damp atmosphere. When the composition is used for the generation of gas, which is done by subjecting the composition to the action of water under pressure, the by-product does not cling to the good material, as moist lime does to calcium carbid, but it falls entirely away, leaving the unused clear material to continue its work of generation.

The new composition possesses not only the merits which have been indicated, but it also possesses special merits in the way of self-regulation in generating gas, as may be understood from the following: Let a quantity of the composition be supported in an inverted bell-glass set down in but free from the bottom of a vessel. Pour water into the vessel till it rises in the bell-glass so as to immerse more or less of the composition. The pressure exerted by the water upon the composition will cause the water to attack the composition and evolve gas. Continued evolution of the gas results in pressure over the water in the bell-glass, the result being that the water is pressed down in the bell-glass, the water rising in the vessel around the bell-glass. When the water shall have been pressed down free of contact with the composition, then generation of gas ceases, the pressure of the gas and the pressure due to the exterior column of water being in equilibrium. The generation ceases under these conditions, because the new composition will not generate gas by reason of mere wetness, direct contact of water under pressure being requisite. If gas be withdrawn from the bell-glass, then the pressure of gas becomes lessened and the water rises and attacks the lowermost portion of the composition and generation of gas begins again. Assuming an illuminating-burner to be connected with the bell-glass, it follows that the mere act of closing the burner to turn out the light causes the pressure to increase and the water to descend below the composition and further generation of gas to cease until the pressure of gas is again lessened by withdrawal.

The new composition requires for its utilization special generating apparatus based on the demonstrating example just suggested. Gas evolved from the new composition and burned in suitable burners gives a peculiarly brilliant and pervasive though soft and pleasing light.

What I claim, and desire to secure by Letters Patent of the United States, is—

1. The herein-described composition of matter for the production of gas, consisting of carbid of calcium, wax, grease, and sugar, substantially as and for the purpose specified.

2. The herein-described composition of matter for the production of gas, consisting of carbid of calcium, paraffin-wax, cocoa-butter, and sugar, substantially as and for the purpose specified.

3. The herein-described process of producing a composition of matter for the production of gas, consisting in melting together wax, grease and sugar, then immersing carbid of calcium in the hot liquid mixture for a time, and then withdrawing and cooling the treated carbid of calcium.

4. The herein-described process of producing a composition of matter for the production of gas, consisting in melting together paraffin-wax, cocoa-butter, and sugar, then immersing carbid of calcium in the melted mixture for a time, and then withdrawing and cooling the treated carbid of calcium.

CHARLES HENRY WORSNOP.

Witnesses:
WILFRID ERNEST WORSNOP,
FRANK DAWSON.